(12) United States Patent
Jain et al.

(10) Patent No.: US 11,165,334 B2
(45) Date of Patent: Nov. 2, 2021

(54) ENHANCING HIGH-VOLTAGE STARTUP VOLTAGE RATING FOR PWM CONTROLLERS WITH INTERNAL HIGH VOLTAGE STARTUP CIRCUIT

(71) Applicant: STMicroelectronics International N.V., Gereva (CH)

(72) Inventors: Akshat Jain, Nahan (IN); Saurabh Sona, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 25 days.

(21) Appl. No.: 16/801,370

(22) Filed: Feb. 26, 2020

(65) Prior Publication Data

US 2020/0304019 A1  Sep. 24, 2020

Related U.S. Application Data

(60) Provisional application No. 62/820,390, filed on Mar. 19, 2019.

(51) Int. Cl.
*H02M 1/36* (2007.01)
*H02M 1/42* (2007.01)
*H02M 1/00* (2006.01)

(52) U.S. Cl.
CPC ........... *H02M 1/36* (2013.01); *H02M 1/4225* (2013.01); *H02M 1/0006* (2021.05)

(58) Field of Classification Search
CPC ..... H02M 1/0006; H02M 1/36; H02M 1/4225
See application file for complete search history.

(56) References Cited

U.S. PATENT DOCUMENTS

| 4,746,813 | A | | 5/1988 | Disser | |
|---|---|---|---|---|---|
| 4,794,270 | A | * | 12/1988 | Park | H02M 3/3385 307/22 |
| 4,814,966 | A | | 3/1989 | Ekstrand | |
| 4,937,728 | A | * | 6/1990 | Leonardi | H02M 3/33523 363/97 |

(Continued)

OTHER PUBLICATIONS

STMicroelectronics: "High Voltage Startup Transition-Mode PFC," L6564H Datasheet—Production Data, Jun. 2012, Doc ID 022960 Rev 2, 35 pages.

*Primary Examiner* — Jue Zhang
(74) *Attorney, Agent, or Firm* — Crowe & Dunlevy

(57) ABSTRACT

A power supply has a transformer with primary and secondary windings. A first terminal of the primary-winding is coupled to a power-input. A PFC includes a low-voltage circuit correcting power factor of the power signal, having a supply-input receiving a supply voltage during normal operation, a feedback-input coupled to a first terminal of the secondary-winding, and a gate-drive-output. A high-voltage startup circuit powers the low-voltage circuit during startup. Periphery circuitry includes a transient voltage suppression diode having an anode coupled to supply power to the high-voltage startup circuit and a cathode coupled to the power-input, a diode having an anode coupled to the first terminal of the secondary-winding and a cathode coupled to the supply-input of the low-voltage circuit. A capacitor is coupled between the supply-input and ground. A transistor has a drain coupled to a second terminal of the primary-winding and a gate coupled to the gate-drive-output.

24 Claims, 3 Drawing Sheets

(56) References Cited

U.S. PATENT DOCUMENTS

| | | | |
|---|---|---|---|
| 5,684,683 A | 11/1997 | Divan et al. | |
| 7,643,260 B2 | 1/2010 | Pierce et al. | |
| 7,977,926 B2 | 7/2011 | Williams | |
| 9,515,568 B2 | 12/2016 | Zhang et al. | |
| 9,590,492 B2 | 3/2017 | Chang et al. | |
| 10,090,777 B2 | 10/2018 | Dent | |
| 2017/0353098 A1* | 12/2017 | Baek | H02M 7/49 |

* cited by examiner

ENHANCING HIGH-VOLTAGE STARTUP VOLTAGE RATING FOR PWM CONTROLLERS WITH INTERNAL HIGH VOLTAGE STARTUP CIRCUIT

RELATED APPLICATION

This application claims priority to U.S. Provisional Application for Patent No. 62/820,390, filed Mar. 19, 2019, the contents of which are incorporated by reference.

TECHNICAL FIELD

This disclosure is directed to a high-voltage startup circuit for analog PWM controllers and in particular, to increase the startup voltage rating of PWM controllers with internal high-voltage startup circuits.

BACKGROUND

A block diagram of a typical prior art power supply 10 is shown in FIG. 1. The power supply 10 includes a filter 12 receiving AC voltage from AC mains 11, where the filter 12 functions to condition the AC voltage and provide the conditioned AC voltage to a bridge rectifier 13. The bridge rectifier 13 rectifies the conditioned AC voltage to produce a rectified DC voltage, and the capacitor C1 smooths this rectified DC voltage. A power factor controller (PFC) 14 receives the rectified DC voltage and, in normal operation, supplies a constant DC output voltage for a post-PFC stage (DC-DC converter, etc.) with an increased power factor over the rectified DC voltage.

While the PFC 14 could be powered during starting up from a powered down condition using an external voltage divider that divides the voltage of the rectified power signal down to a magnitude that the PFC 14 can tolerate at that point, such a voltage divider would undesirably have a constant power consumption even after the PFC 14 has reached normal operating conditions and is switching as designed. In higher voltage applications and/or situations where the rectified power signal is multi-phase, this static power consumption would be even greater, and even more undesirable.

Therefore, it is not preferred to start the PFC 14 directly by using a voltage divider powered by the rectified DC voltage when starting up from a powered down condition. Instead, a dedicated high-voltage startup circuit 15 (external to the PFC 14) can be used to power the PFC 14 only when starting up from a powered down condition and until the PFC 14 is switching properly in normal operation. Once the PFC supply voltage is generated by the switching action during normal operation, the external high voltage startup circuit is disabled to minimize static power consumption.

In some cases, it is desirable for the high-voltage startup circuit to not be external to the PFC 14, but to instead be integrated within the PFC. Such an embodiment of the power supply 10' is shown in FIG. 2. Here, periphery circuitry 17 receives the rectified power signal and appropriately couples it to a power factor controller (PFC) package 18. The PFC controller 18 has an internal on chip high-voltage startup generator 18a along with a low-voltage control circuit 18b integrated within the same package. The high-voltage startup integrated circuit 18a powers the low-voltage integrated circuit 18b during startup conditions until the low-voltage integrated circuit 18b reaches normal operating conditions, at which point the low-voltage integrated circuit 18b is then powered via the periphery circuity 17 and also disables the high voltage startup circuit. The low-voltage integrated circuit 18b in cooperation with the periphery circuitry 17 provides a stable DC voltage with improved power factor.

While the above described designs represent a clear improvement over the use of a simple voltage divider, improvement is still needed, particularly for high-voltage operations and for multi-phase operations. With the inventive enhancements that will be described below, it is possible to use PWM controllers with internal high voltage startup designed for 230V mains operation even for multi-phase and higher voltage supply applications.

SUMMARY

Disclosed herein is a power supply including a power signal input receiving a power signal, a transformer having primary and secondary windings with the primary winding having a first terminal coupled to the power signal input, and a power factor controller. The power factor controller includes a low-voltage circuit configured for correcting power factor of the power signal, the low-voltage circuit having a supply voltage input for receiving a supply voltage for powering the low-voltage circuit during normal operation, at least one feedback input coupled to a first terminal of the secondary winding of the transformer, and a gate drive output. The power factor controller also includes a high-voltage startup circuit configured for powering the low-voltage circuit at least during startup of the power supply. Periphery circuitry includes at least one transient voltage suppression diode having an anode coupled to supply power to the high-voltage startup circuit for powering the high-voltage startup circuit and a cathode coupled to the power signal input, a diode having an anode coupled to the first terminal of the secondary winding of the transformer and a cathode coupled to the supply voltage input of the low-voltage circuit, a supply capacitor coupled between the supply voltage input of the low-voltage circuit and ground, and a MOSFET having a first conduction terminal coupled to a second terminal of the secondary winding of the transformer and a gate terminal coupled to the gate drive output of the low-voltage circuit.

The at least one transient voltage suppression diode may be sized so as to operate in breakdown in response to the high-voltage startup circuit drawing a startup current from the power signal input through the at least one transient voltage suppression diode.

The at least one transient voltage suppression diode may be sized so that a startup current drawn by the high-voltage startup circuit from the power signal input through the at least one transient voltage suppression diode is insufficient to cause the at least one transient voltage suppression diode to operate in breakdown, and the periphery circuitry may include at least one resistor coupled between the cathode of the at least one transient voltage suppression diode and ground to cause drawing of an additional startup current from the power signal input through the at least one transient voltage suppression diode.

The at least one resistor may have a resistance value such that a sum of the startup current and the additional startup current through the at least one resistor is sufficient to cause the at least one transient voltage suppression diode to operate in breakdown and such that the additional startup current due to the at least one resistor on its own is insufficient to cause the at least one transient voltage suppression diode to operate in breakdown.

The at least one transient voltage suppression diode may be a plurality of series connected transient voltage suppression diodes.

The low-voltage circuit may generate a gate drive signal at the gate drive output in response to input received at the at least one feedback input, the gate drive signal resulting in switching of the MOSFET, the switching of the MOSFET resulting in current flowing out the first terminal of the secondary winding of the transformer toward the supply voltage input of the low-voltage circuit.

The current flowing out the first terminal of the secondary winding may charge the supply capacitor, and startup of the power supply ends and normal operation of the power supply may begin when the supply capacitor is charged to a threshold level.

A load or DC-DC converter may be coupled to a second terminal of the primary winding of the transformer through a series coupled diode and a parallel coupled diode.

The power supply may also include a filter coupled to AC mains and configured for conditioning a signal received from the AC mains, and a bridge rectifier coupled to the filter and configured to rectify a signal received from the filter to produce the power signal supplied to the power signal input.

Also disclosed herein is a method of operating a power supply. The method includes steps of: a) operating the power supply during startup conditions by: 1) powering an internal high-voltage startup integrated circuit within a power factor controller package by the internal high-voltage startup integrated circuit drawing a startup current from a rectified power input and through a reverse biased transient voltage suppression diode; and 2) powering an internal low-voltage power factor correction integrated circuit within the power factor controller package using the internal high-voltage startup integrated circuit; and b) operating the power supply during normal conditions after startup by powering the internal low-voltage power factor correction integrated circuit by: 1) switching a MOSFET coupled to a second terminal of a primary transformer winding having a first terminal coupled to the rectified power input, using the internal low-voltage power factor correction integrated circuit; and 2) drawing a normal operating current into the internal low-voltage power factor correction integrated circuit from a secondary transformer winding magnetically coupled to the primary transformer winding.

The internal high-voltage startup integrated circuit drawing the startup current from the rectified power input and through the reverse biased transient voltage suppression diode may be the internal high-voltage startup integrated circuit drawing a startup current from the rectified power input through the reverse biased transient voltage suppression diode sufficient to cause the reverse biased transient voltage suppression diode to operate in breakdown.

Powering the internal high-voltage startup integrated circuit also includes drawing an additional startup current from the rectified power input, through the reverse biased transient voltage suppression diode, and through a resistor coupled between an anode of the reversed biased transient voltage suppression diode and ground, such that a sum of the startup current and the additional startup current is sufficient to cause the reverse biased transient voltage suppression diode to operate in breakdown, but such that the additional startup current drawn through the reversed biased transient voltage suppression diode on its own is insufficient to cause the reversed biased transient voltage suppression diode to operate in breakdown.

Also disclosed herein is periphery circuitry for a power supply. The periphery circuitry includes a first capacitor and first resistor connected in parallel between a rectified power signal node and a first intermediate node, a second capacitor and second resistor connected in parallel between the first intermediate node and a second intermediate node, a third capacitor and third resistor connected in series between the second intermediate node and ground, a power MOS connected in series between the rectified power signal node and a high voltage input node of a power factor controller, and a zener diode coupled and configured to protect a gate of the power MOS.

The power MOS may be an NMOS transistor having a drain connected to the rectified power signal node, a source connected to the high voltage input node of the power factor controller, and a gate connected to the first intermediate node.

The zener diode may have an anode connected to the high voltage input node of the power factor controller and a cathode connected to the first intermediate node.

Also disclosed herein is a power supply including a power signal input receiving a power signal, and a transformer having primary and secondary windings, with the primary winding having a first terminal coupled to the power signal input. The power supply also includes a power factor controller having a low-voltage circuit configured for correcting power factor of the power signal, the low-voltage circuit having a supply voltage input for receiving a supply voltage for powering the low-voltage circuit during normal operation, and a high-voltage startup circuit configured for powering the low-voltage circuit at least during startup of the power supply. The power supply also includes periphery circuitry with at least one transient voltage suppression diode coupled to supply power to the high-voltage startup circuit for powering the high-voltage startup circuit, a diode coupled between the first terminal of the secondary winding of the transformer and the supply voltage input of the low-voltage circuit, a supply capacitor coupled between the supply voltage input of the low-voltage circuit and ground, and a transistor coupled between a second terminal of the primary winding of the transformer and a PWM comparator input, the transistor controlled by the gate drive output of the low-voltage circuit.

The at least one transient voltage suppression diode is sized so as to operate in breakdown in response to the high-voltage startup circuit drawing a startup current from the power signal input.

The at least one transient voltage suppression diode may be sized so that a startup current drawn by the high-voltage startup circuit from the power signal input is insufficient to cause the at least one transient voltage suppression diode to operate in breakdown. The periphery circuitry may also include at least one resistor to cause drawing of an additional startup current from the power signal input through the at least one transient voltage suppression diode.

The at least one resistor has a resistance value such that a sum of the startup current and the additional startup current is sufficient to cause the at least one transient voltage suppression diode to operate in breakdown.

The at least one transient voltage suppression diode may be a plurality of series connected transient voltage suppression diodes.

The low-voltage circuit may generate a gate drive signal at the gate drive output in response to input received at the at least one feedback input, the gate drive signal resulting in switching of the transistor.

Current flowing out the first terminal of the secondary winding may charge the supply capacitor, and startup of the power supply ends and normal operation of the power supply may begin when the supply capacitor is charged to a threshold level.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
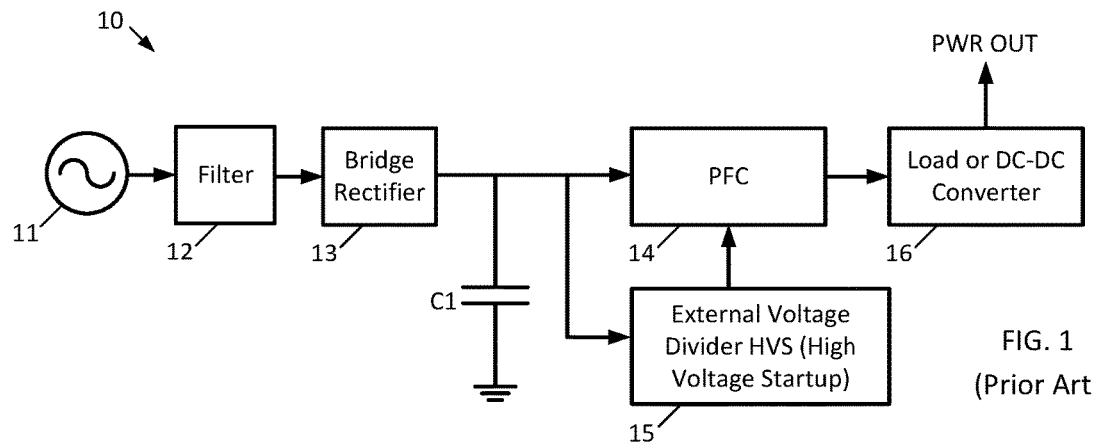
FIG. 1 is a block diagram of a prior art power supply in which a PFC is externally powered during startup.
Figure 2:
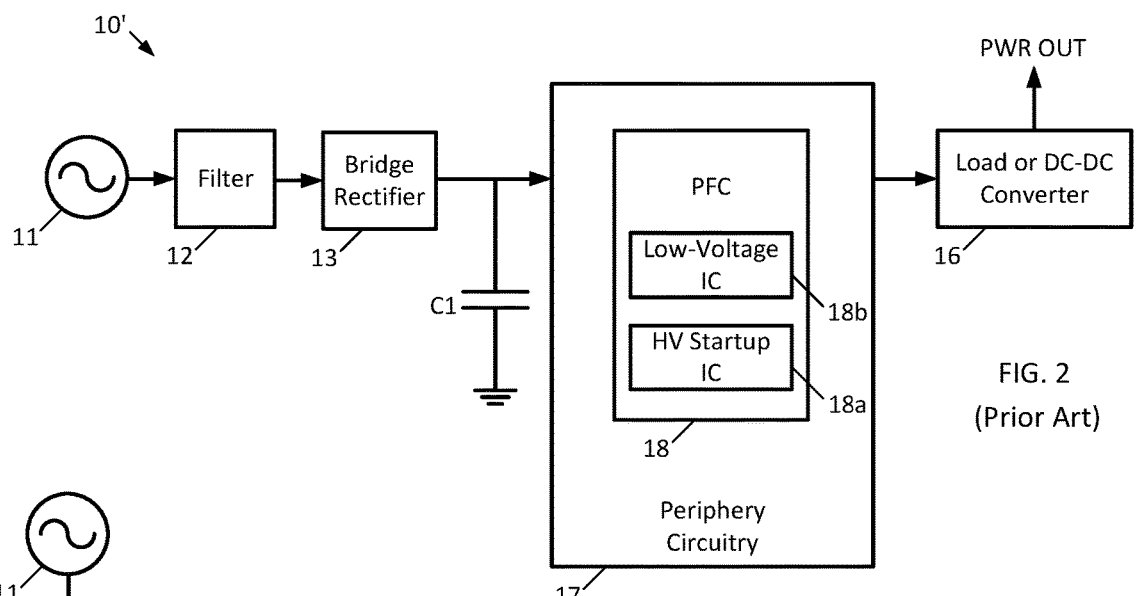
FIG. 2 is a block diagram of a prior art power supply in which a PFC is internally powered by internal high-voltage startup circuitry during startup.
Figure 3:
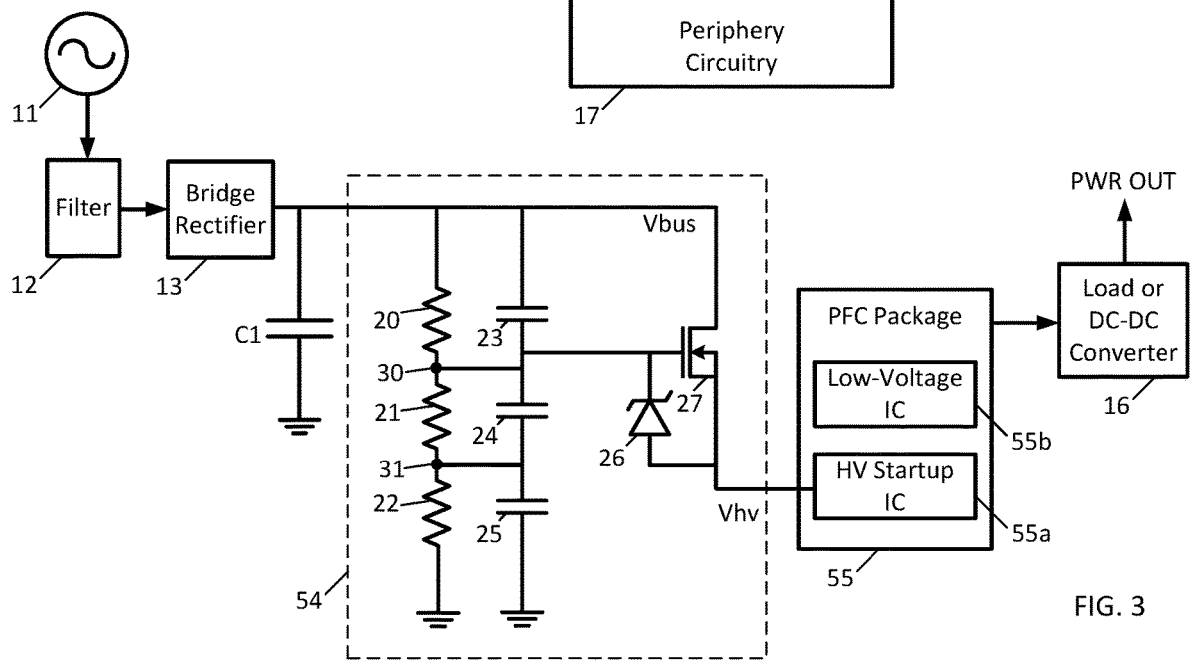
FIG. 3 is a more detailed block diagram of a PFC together with its periphery circuitry, the PFC being internally powered by internal high-voltage startup circuitry during startup but utilizing an external MOSFET within the periphery circuitry to enhance the startup voltage rating, such as may be used in a power supply.

For high-voltage or multi-phase applications, such as shown in FIG. 3, the following design for the periphery circuitry 54 and PFC 55 may be used. The PFC 55 is a single device package that has both a high-voltage startup circuit 55a (e.g., a high-voltage startup integrated circuit 55a) and a low-voltage control circuit 55b (e.g., a low-voltage control integrated circuit) therein. Periphery circuitry refers to circuitry disposed externally to, but close to, the PFC 55.

The high-voltage startup integrated circuit 55a and low-voltage control circuit 55b can be formed using different manufacturing technologies as separate die to support the different operating voltages and are then integrated together inside the PFC controller 55. The high-voltage startup integrated circuit 55a along with the periphery circuit 54 powers the low-voltage integrated circuit 55b during startup until the low-voltage integrated circuit 55b reaches normal operating conditions, at which point the low-voltage integrated circuit 55b is then powered via the conventional auxiliary winding of the PFC inductor.

The powering of the high-voltage startup integrated circuit 55a by the periphery circuitry 54 is now described. The periphery circuitry 54 includes resistors 20, 21, 22 coupled in series between the rectified power signal (having a voltage of Vbus) and ground, and capacitors 23, 24, 25 coupled in series between the rectified power signal and ground. The resistors 20, 21, 22 and capacitors 23, 24, 25 are interconnected in a ladder structure. Node 30 is the center tap of the series connected resistors 20 and 21, as well as of the series connected capacitors 23 and 24. Node 31 is the center tap of the series connected resistors 21 and 22, as well as of the series connected capacitors 24 and 25.

An N-channel MOSFET (e.g., depletion type) 27 has its gate coupled to node 30, its drain coupled to the rectified power signal, and its source coupled to the high-voltage startup input pin of the integrated circuit 55a. Zener diode 26 is coupled between the gate and source of the N-channel MOSFET 27 protects the gate of the N-channel MOSFET 27.

The N-channel MOSFET 27 is sized so as to be able to withstand the voltage Vbus of the rectifier output in association with the voltage rating of the internal High Voltage Generator MOSFET. The external N-channel MOSFET 27 is biased at two-third the rectified bus voltage available at node 30. The external N-channel MOSFET 27 operates in the active region and a voltage drop which is approximately equal to a third of the rectified bus voltage is seen across the drain-source of this MOSFET 27. Therefore the internal High Voltage Generator MOSFET only sees approximately two third the input DC voltage and the maximum input voltage rating of the startup generator is enhanced by one third of the maximum expected input voltage value.

The design of FIG. 3 is effective at extending the upper startup voltage limit of the high-voltage startup integrated circuit 55a. However, the use of the N-channel MOSFET 27 within the periphery is undesirable in some applications, as it can be physically large and costly. Therefore, the periphery circuitry 54' and the PFC 55' of FIG. 4 have been developed.

Figure 4:
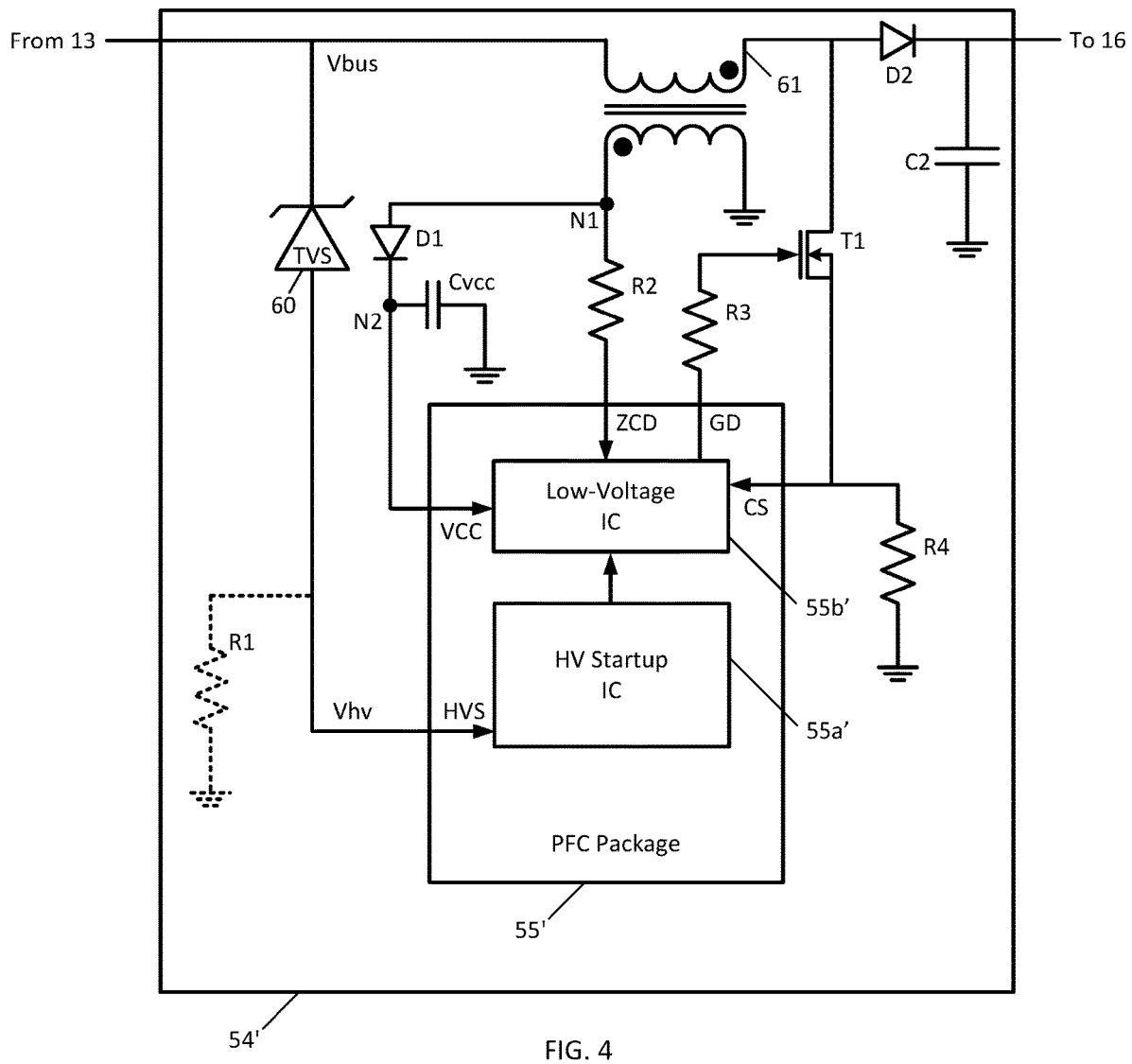
FIG. 4 is a schematic block diagram of an improved PFC together with its periphery circuitry, the PFC being internally powered by internal high-voltage startup circuitry during startup, such as may be used to enhance startup voltage rating in a power supply in accordance with this disclosure.

The periphery circuitry 54' and PFC 55' of FIG. 4 are now described. The PFC 55' is unchanged from the PFC 55 described above, although specific inputs and outputs of the PFC 55' not previously described above will be described below. Note that a transient-voltage-suppression (TVS) diode 60 (such as a Transil® diode as manufactured and sold by STMicroelectronics) has its anode coupled to the high-voltage startup integrated circuit 55a' at high-voltage startup pin HVS of the PFC 55', and its cathode coupled to the bridge rectifier 13 to receive the rectified DC bus voltage. Also note that an optional resistor R1 is coupled between the anode of the transient voltage suppression diode 60 and ground, that diode D2 is coupled in series between the second terminal of the primary winding of the transformer 61 and the load or DC-DC converter 16, and that capacitor C2 is coupled between the cathode of diode D2 and ground.

During startup, the high-voltage startup integrated circuit 55a' draws approximately 1 mA-3 mA through the high-voltage startup pin HVS. The transient voltage suppression diode 60 is sized so that it operates in its breakdown region during startup, and indeed, a typical transient voltage suppression diode breaks down at approximately 1 mA of current. Since the voltage across the transient voltage suppression diode 60 in breakdown region remains at approximately the breakdown voltage Vbr of the transient voltage suppression diode 60, the maximum voltage Vhv seen at the high-voltage startup pin HVS of the high-voltage startup integrated circuit 55a' is the voltage Vbus of the rectified power signal from the bridge rectifier 13, less the breakdown voltage Vbr of the transient voltage suppression diode 60, in other words, Vbus–Vbr. Thus, the use of the transient voltage suppression diode 60 coupled in series to the high-voltage startup pin HVS of the high-voltage startup integrated circuit 55a' serves to reduce the voltage on the high-voltage startup integrated circuit 55a' by Vbr. Therefore, the maximum voltage startup voltage rating of the PFC 55' is increased by the breakdown voltage Vbr of the transient voltage suppression diode 60, yet the static power consumption by the high-voltage startup circuit 55a' after startup is negligible or nearly zero since the high-voltage startup circuit 55a' is disabled by the low-voltage control circuit 55b' during normal switching operation. Note that a transient voltage suppression diode 60 is used over typical Zener diode due to the higher breakdown voltage possessed by a transient voltage suppression diode.

In some cases, the transient voltage suppression diode 60 may be sized so that the current drawn by the high-voltage startup integrated circuit 55a alone during startup is insufficient for the transient voltage suppression diode 60 to reach breakdown. In these cases, the optional resistor R1 is present, and its resistance value is set to draw sufficient current such that the total current drawn through the transient voltage suppression diode 60 (which is current drawn by the high-voltage startup integrated circuit 55a' plus the current drawn through the resistor R1) becomes sufficient for the transient voltage suppression diode 60 to achieve breakdown. It should be appreciated, however, that the resistance value of the resistor R1 as set is insufficient to draw a current through the transient voltage suppression diode 60 having a magnitude great enough to cause breakdown in the absence of current drawn by the high-voltage startup integrated circuit 55a'. Therefore, even with the use of the optional configuration resistor R1, static current consumption by the high-voltage startup integrated circuit 55a' after startup remains negligible or at nearly zero.

Figure 5:
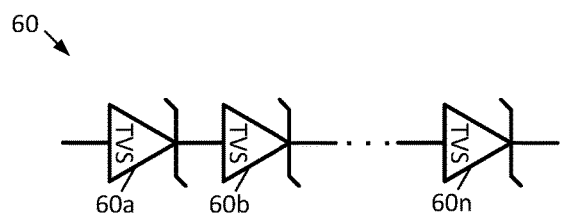
FIG. 5 is a schematic block diagram showing a possible configuration of the transient voltage suppression diode of FIG. 4.

Also understand that the transient voltage suppression diode 60 may be a single transient voltage suppression diode as shown in FIG. 4, or in some cases, may be any number of transient voltage suppression diodes 60a . . . 60n connected in series as shown in FIG. 5. By coupling multiple transient voltage suppression diodes 60a . . . 60n in series, the maximum voltage startup voltage rating of the PFC 55' can be increased by a desired amount.

The remainder of the PFC 55' and periphery circuitry 54' is now described. Transformer 61 has a primary winding having its first terminal coupled to receive the rectified power signal from the bridge rectifier 13. A secondary winding of the transformer 61 has a first terminal coupled to node N1 and a second terminal coupled to ground. A resistor R2 is coupled between node N1 and a zero cross detect input ZCD of the low-voltage integrated circuit 55b'. A diode D1 has its anode coupled to node N1 and its cathode coupled to node N2. Node N2 is coupled to a supply voltage input VCC of the low-voltage integrated circuit 55b'. A capacitor Cvcc is coupled between node N2 and ground.

A resistor R3 is coupled between a gate drive output of the low-voltage integrated circuit 55b' and a gate of an N-channel MOSFET (e.g., depletion mode type) T1. The source of the N-channel MOSFET T1 is coupled to a PWM comparator input CS of the low-voltage integrated circuit 55b' and the drain of the N-channel MOSFET T1 is coupled to a second terminal of the primary winding of the transformer 61 (and thus to the DC-DC converter 56). A resistor R4 is coupled between the PWM comparator input CS of the low-voltage integrated circuit 55b' and ground.

In operation, at startup, the primary winding of the transformer 61 is charged by the rectified DC voltage. The high-voltage startup integrated circuit 55a' powers the low-voltage integrated circuit 55b' as stated. In response to the zero cross input and the PWM comparator input CS, the low-voltage integrated circuit 55b', via the signal produced at its gate drive output, begins to switch the N-channel MOSFET T1, causing current to flow from the secondary winding of the transformer 61. This charges the capacitor Cvcc. Once the capacitor Cvcc is charged, normal operation is reached, and the high-voltage startup integrated circuit 55a' is disabled by internal control logic and no longer supplies the low-voltage integrated circuit 55b'. Instead, in normal operation, the low-voltage integrated circuit 55b' is powered via the voltage at the VCC input provided by the current from the secondary winding of the transformer 61 keeping the capacitor Cvcc charged.

Figure 6:
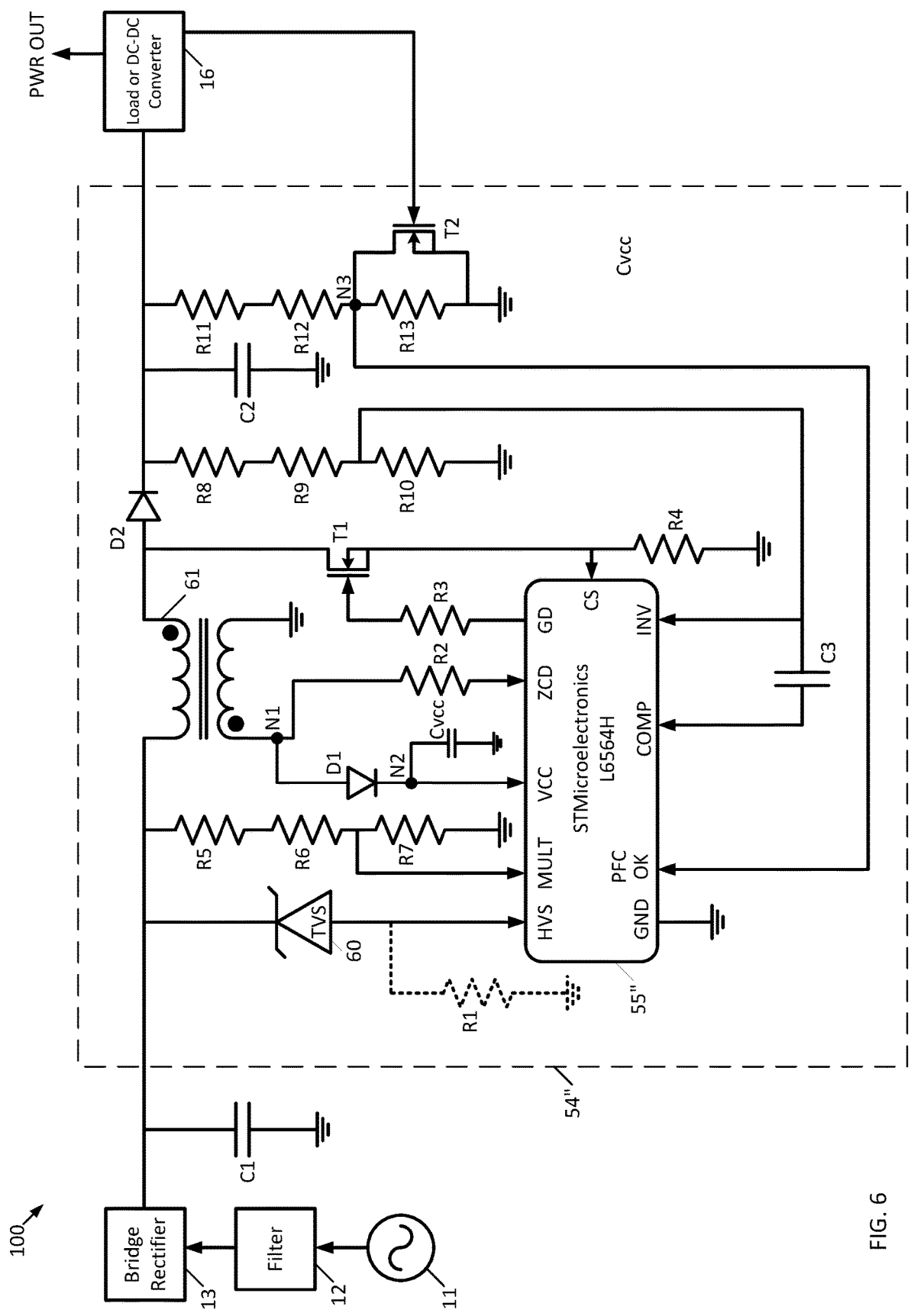
FIG. 6 is a detailed schematic block diagram of a possible configuration for a power supply utilizing an improved PFC that is internally powered by internal high-voltage startup circuitry during startup such as may be used to enhance the startup voltage rating in accordance with this disclosure.

Another arrangement for the PFC 55" and periphery circuitry 54" is now described with reference to the system diagram of FIG. 6 that shows the power supply 100. Here, the PFC 55" is specifically the model L6564H produced by STMicroelectronics, and specific details of this PFC can be found in the "L6564H High voltage startup transition-mode PFC Datasheet", Doc ID 022960 Rev 2, June 2012, published by STMicroelectronics on its website, the contents of which are hereby incorporated by reference in their entirety. While the specific internal details of the PFC 55" are not described below for brevity, note that they do in general follow the description of the PFC 55' described above.

The periphery circuitry 54" includes the transient voltage suppression diode 60 having its anode coupled to the high-voltage startup integrated circuit 55a" at high-voltage startup pin HVS, and its cathode coupled to the bridge rectifier 13 to receive the rectified DC voltage. An optional resistor R1 is coupled between the anode of the transient voltage suppression diode 60 and ground. The transient voltage suppression diode 60 is as described above, performs the functions described above, and needs no additional description.

Resistors R5, R6, R7 are coupled in series between the rectified power signal and ground, with a center tap between R6 and R7 being coupled to the MULT input of the PFC 55", the MULT input being used by the PFC 55" to sense the voltage of the rectified power signal.

Transformer 61 has a primary winding having its first terminal coupled to receive the rectified power signal from the bridge rectifier 13. A secondary winding of the transformer 61 has a first terminal coupled to node N1 and a second terminal coupled to ground. A resistor R2 is coupled between node N1 and a zero cross detect input ZCD of the low-voltage integrated circuit 55b". A diode D1 has its anode coupled to node N1 and its cathode coupled to node N2. Node N2 is coupled to a supply voltage input VCC of the low-voltage integrated circuit 55b". A capacitor Cvcc is coupled between node N2 and ground.

A resistor R3 is coupled between a gate drive output GD of the low-voltage integrated circuit 55b" and a gate of an N-channel MOSFET (e.g., depletion mode type) T1. The source of the N-channel MOSFET T1 is coupled to a PWM comparator input CS of the low-voltage integrated circuit 55b" and the drain of the N-channel MOSFET T1 is coupled to a second terminal of the primary winding of the transformer 61 (and thus to the power converter 16, which may be a DC-DC converter). A resistor R4 is coupled between the PWM comparator input CS of the low-voltage integrated circuit 55b" and ground.

Diode D2 has its anode coupled to the second terminal of the primary winding of the transformer 61 and its cathode coupled to the power converter 16. Resistors R8, R9, R10 are coupled in series between the cathode of the diode D2 and ground, with the center tap between resistors R9 and R10 being coupled directly to the INV terminal (error amplifier input) of the PFC 55", and being coupled through the capacitor C3 to the COMP terminal (error amplifier output) of the PFC 55". Capacitor C2 is coupled between the cathode of the diode D2 and ground.

Resistors R11, R12, R13 are coupled between the cathode of the diode D2 and ground. Node N3 is the center tap between resistors R12 and R13, and is coupled to the PFC OK terminal of the PFC 55" that is used for operating condition monitoring. An N-channel MOSFET T2 (e.g., depletion mode type) has its drain coupled to node N3, its source coupled to ground, and its gate receives a control signal from the power converter 16.

Operation of the PFC 55" proceeds in general as described above with reference to PFC 55. Additional details need not be given, and are found in the "L6564H High voltage startup transition-mode PFC Datasheet".

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A power supply, comprising:
   a power signal input configured to receive a power signal;
   a transformer having primary and secondary windings, the primary winding having a first terminal coupled to the power signal input;
   a power factor controller comprising:
      a low-voltage circuit configured to correct power factor of the power signal, the low-voltage circuit having a supply voltage input configured to receive a supply voltage to power the low-voltage circuit during normal operation, at least one feedback input coupled to a first terminal of the secondary winding of the transformer, and a gate drive output; and
      a high-voltage startup circuit configured to power the low-voltage circuit at least during startup of the power supply; and
   periphery circuitry comprising:
      at least one transient voltage suppression diode having an anode coupled to supply power to the high-voltage startup circuit to power the high-voltage startup circuit and a cathode coupled to the power signal input;
      a diode having an anode coupled to the first terminal of the secondary winding of the transformer and a cathode coupled to the supply voltage input of the low-voltage circuit;
      a supply capacitor coupled between the supply voltage input of the low-voltage circuit and ground; and
      a transistor having a first conduction terminal coupled to a second terminal of the primary winding of the transformer and a gate terminal coupled to the gate drive output of the low-voltage circuit.

2. The power supply of claim 1, wherein the at least one transient voltage suppression diode is sized to operate in breakdown in response to the high-voltage startup circuit drawing a startup current from the power signal input through the at least one transient voltage suppression diode.

3. The power supply of claim 1, wherein the at least one transient voltage suppression diode is sized so that a startup current drawn by the high-voltage startup circuit from the power signal input through the at least one transient voltage suppression diode is insufficient to cause the at least one transient voltage suppression diode to operate in breakdown; and wherein the periphery circuitry further comprises at least one resistor coupled between the cathode of the at least one transient voltage suppression diode and ground to cause drawing of an additional startup current from the power signal input through the at least one transient voltage suppression diode.

4. The power supply of claim 3, wherein the at least one resistor has a resistance value such that a sum of the startup current and the additional startup current through the at least one resistor is sufficient to cause the at least one transient voltage suppression diode to operate in breakdown and such that the additional startup current due to the at least one resistor on its own is insufficient to cause the at least one transient voltage suppression diode to operate in breakdown.

5. The power supply of claim 1, wherein the at least one transient voltage suppression diode comprises a plurality of series connected transient voltage suppression diodes.

6. The power supply of claim 1, wherein the low-voltage circuit is configured to generate a gate drive signal at the gate drive output in response to input received at the at least one feedback input, the gate drive signal causing switching of the transistor to permit current to flow out the first terminal of the secondary winding of the transformer toward the supply voltage input of the low-voltage circuit due to magnetic coupling.

7. The power supply of claim 6, wherein the current flow out the first terminal of the secondary winding charges the supply capacitor; and wherein startup of the power supply ends and normal operation of the power supply begins when the supply capacitor is charged to a threshold level.

8. The power supply of claim 1, further comprising a DC-DC converter coupled to a second terminal of the primary winding of the transformer.

9. The power supply of claim 1, further comprising:
   a filter coupled to AC mains and configured to condition a signal received from the AC mains; and
   a bridge rectifier coupled to the filter and configured to rectify a signal received from the filter to produce the power signal supplied to the power signal input.

10. A method of operating a power supply, comprising steps of:
    a) operating the power supply during startup conditions by:
       1) powering an internal high-voltage startup integrated circuit within a power factor controller package by the internal high-voltage startup integrated circuit drawing a startup current from a rectified power input and through a reverse biased transient voltage suppression diode; and
       2) powering an internal low-voltage power factor correction integrated circuit within the power factor controller package using the internal high-voltage startup integrated circuit; and
    b) operating the power supply during normal conditions after startup by powering the internal low-voltage power factor correction integrated circuit by:
       1) switching a transistor coupled to a second terminal of a primary transformer winding having a first terminal coupled to the rectified power input, using the internal low-voltage power factor correction integrated circuit; and
       2) drawing a normal operating current into the internal low-voltage power factor correction integrated circuit from a secondary transformer winding magnetically coupled to the primary transformer winding.

11. The method of claim 10, wherein the internal high-voltage startup integrated circuit drawing the startup current from the rectified power input and through the reverse biased transient voltage suppression diode comprises the internal high-voltage startup integrated circuit drawing a startup current from the rectified power input through the reverse biased transient voltage suppression diode sufficient to cause the reverse biased transient voltage suppression diode to operate in breakdown.

12. The method of claim 10, wherein powering the internal high-voltage startup integrated circuit also includes drawing an additional startup current from the rectified power input, through the reverse biased transient voltage suppression diode, and through a resistor coupled between an anode of the reversed biased transient voltage suppression diode and ground, such that a sum of the startup current and the additional startup current through the resistor is sufficient to cause the reverse biased transient voltage suppression diode to operate in breakdown, but such that the additional startup current drawn through the resistor on its own is insufficient to cause the reversed biased transient voltage suppression diode to operate in breakdown.

13. A power supply, comprising:
a power signal input receiving a power signal;
a transformer having primary and secondary windings, the primary winding having a first terminal coupled to the power signal input;
a power factor controller comprising:
 a low-voltage circuit having a supply voltage input; and
 a high-voltage startup circuit having an output coupled to the supply voltage input of the low-voltage circuit; and
periphery circuitry comprising:
 at least one transient voltage suppression diode having an anode coupled to the high-voltage startup circuit and a cathode coupled to the power signal input;
 a diode having an anode coupled to the first terminal of the secondary winding of the transformer and a cathode coupled to the supply voltage input of the low-voltage circuit; and
 a supply capacitor coupled between the supply voltage input of the low-voltage circuit and ground.

14. The power supply of claim 13, wherein the at least one transient voltage suppression diode is sized to operate in breakdown in response to the high-voltage startup circuit drawing a startup current from the power signal input through the at least one transient voltage suppression diode.

15. The power supply of claim 13, wherein the at least one transient voltage suppression diode is sized so that a startup current drawn by the high-voltage startup circuit from the power signal input through the at least one transient voltage suppression diode is insufficient to cause the at least one transient voltage suppression diode to operate in breakdown; and wherein the periphery circuitry further comprises at least one resistor coupled between the cathode of the at least one transient voltage suppression diode and ground to cause drawing of an additional startup current from the power signal input through the at least one transient voltage suppression diode.

16. The power supply of claim 15, wherein the at least one resistor has a resistance value such that a sum of the startup current and the additional startup current through the at least one resistor is sufficient to cause the at least one transient voltage suppression diode to operate in breakdown and such that the additional startup current due to the at least one resistor on its own is insufficient to cause the at least one transient voltage suppression diode to operate in breakdown.

17. The power supply of claim 13, wherein the at least one transient voltage suppression diode comprises a plurality of series connected transient voltage suppression diodes.

18. A power supply, comprising:
a power signal input configured to receive a power signal;
a transformer having primary and secondary windings, the primary winding having a first terminal coupled to the power signal input;
a power factor controller comprising:
 a low-voltage circuit configured to correct power factor of the power signal, the low-voltage circuit having a supply voltage input configured to receive a supply voltage for powering the low-voltage circuit during normal operation; and
 a high-voltage startup circuit configured to power the low-voltage circuit at least during startup of the power supply; and
periphery circuitry comprising:
 at least one transient voltage suppression diode coupled to supply power to the high-voltage startup circuit to power the high-voltage startup circuit;
 a diode coupled between the first terminal of the secondary winding of the transformer and the supply voltage input of the low-voltage circuit;
 a supply capacitor coupled between the supply voltage input of the low-voltage circuit and ground; and
 a transistor coupled between a second terminal of the primary winding of the transformer and a PWM comparator input, the transistor controlled by a gate drive output of the low-voltage circuit.

19. The power supply of claim 18, wherein the at least one transient voltage suppression diode is sized to operate in breakdown in response to the high-voltage startup circuit drawing a startup current from the power signal input.

20. The power supply of claim 18, wherein the at least one transient voltage suppression diode is sized so that a startup current drawn by the high-voltage startup circuit from the power signal input is insufficient to cause the at least one transient voltage suppression diode to operate in breakdown; and wherein the periphery circuitry further comprises at least one resistor to cause drawing of an additional startup current from the power signal input through the at least one transient voltage suppression diode.

21. The power supply of claim 20, wherein the at least one resistor has a resistance value such that a sum of the startup current and the additional startup current is sufficient to cause the at least one transient voltage suppression diode to operate in breakdown.

22. The power supply of claim 18, wherein the at least one transient voltage suppression diode comprises a plurality of series connected transient voltage suppression diodes.

23. The power supply of claim 18, wherein the low-voltage circuit generates a gate drive signal at the gate drive output in response to input received at at least one feedback input of the low-voltage circuit, the gate drive signal resulting in switching of the transistor.

24. The power supply of claim 23, wherein current flowing out the first terminal of the secondary winding charges the supply capacitor; and wherein startup of the power supply ends and normal operation of the power supply begins when the supply capacitor is charged to a threshold level.

* * * * *